US011615340B2

(12) United States Patent
Mallick et al.

(10) Patent No.: US 11,615,340 B2
(45) Date of Patent: *Mar. 28, 2023

(54) METHODS AND APPARATUS FOR APPLICATION PREDICTION THROUGH MACHINE LEARNING BASED ANALYSIS OF IO PATTERNS

(71) Applicant: EMC IP Holding Company LLC, Hopkinton, MA (US)

(72) Inventors: Sanjib Mallick, Bangalore (IN); Vinay G. Rao, Bangalore (IN); Gopinath Marappan, Coimbatore (IN); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 883 days.

This patent is subject to a terminal disclaimer.

(21) Appl. No.: 16/420,493

(22) Filed: May 23, 2019

(65) Prior Publication Data
US 2020/0372401 A1 Nov. 26, 2020

(51) Int. Cl.
*G06N 20/00* (2019.01)
*H04L 67/1097* (2022.01)
(Continued)

(52) U.S. Cl.
CPC ......... *G06N 20/00* (2019.01); *G06F 13/1668* (2013.01); *G06F 13/4022* (2013.01); *H04L 67/1097* (2013.01)

(58) Field of Classification Search
CPC .... G06N 20/00; G06N 3/082; G06F 13/1668; G06F 13/4022; H04L 67/1097
(Continued)

(56) References Cited

U.S. PATENT DOCUMENTS 6,687,746 B1 2/2004 Shuster et al.
6,697,875 B1 2/2004 Wilson
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — David R Lazaro
*Assistant Examiner* — Zia Khurshid
(74) *Attorney, Agent, or Firm* — Ryan, Mason & Lewis, LLP

(57) ABSTRACT

An apparatus comprises a host device configured to communicate over a network with a storage system. The host device comprises a multi-path input-output driver configured to control delivery of input-output operations from the host device to the storage system over selected ones of a plurality of paths through the network. The multi-path input-output driver is further configured to collect information characterizing input-output patterns for each of a plurality of different applications executing on the host device, and to provide the collected information to a machine learning system. The machine learning system utilizes the collected information to generate one or more application predictions based at least in part on analysis of observed input-output patterns. The collected information in some embodiments comprises statistical distributions of numbers of input-output operations having payload sizes falling into specified ranges over a given time period.

20 Claims, 6 Drawing Sheets

(51) Int. Cl.
*G06F 13/16* (2006.01)
*G06F 13/40* (2006.01)

(58) Field of Classification Search
USPC .......................................................... 706/12
See application file for complete search history.

(56) References Cited

U.S. PATENT DOCUMENTS

| | | | |
|---|---|---|---|
| 7,454,437 | B1 | 11/2008 | Lavallee et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,904,681 | B1 | 3/2011 | Bappe et al. |
| 7,925,872 | B2 | 4/2011 | Lai et al. |
| 9,372,637 | B1* | 6/2016 | Alatorre ............... G06F 16/252 |
| 9,400,611 | B1 | 7/2016 | Raizen |
| 9,594,780 | B1 | 3/2017 | Esposito et al. |
| 9,778,852 | B1 | 10/2017 | Marshak et al. |
| 2004/0010563 | A1 | 1/2004 | Forte et al. |
| 2008/0043973 | A1 | 2/2008 | Lai et al. |
| 2011/0197027 | A1 | 8/2011 | Balasubramanian et al. |
| 2012/0150805 | A1* | 6/2012 | Pafumi ............... G06F 11/1415 |
| | | | 707/E17.007 |
| 2016/0117113 | A1 | 4/2016 | Li et al. |
| 2018/0189635 | A1 | 7/2018 | Olarig et al. |
| 2019/0095299 | A1 | 3/2019 | Liu et al. |
| 2019/0108888 | A1 | 4/2019 | Sarkar et al. |
| 2019/0114078 | A1* | 4/2019 | Oh ........................ G06F 3/0604 |
| 2019/0121350 | A1* | 4/2019 | Celia .................... H04B 17/345 |

OTHER PUBLICATIONS

NVM Express, "NVM Express, Revision 1.3," NVM Express, May 1, 2017, 282 pages.
VMWare, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
U.S. Appl. No. 15/849,828 filed in the name of Sanjib Mallick et al. Dec. 21, 2017 and entitled "Storage System with Input-Output Performance Control Utilizing Application Process Detection."

* cited by examiner

```
def baseline_model():
    model = Sequential()

# Dense(64) is a fully-connected layer with 64 hidden units.
    # in the first layer, you must specify the expected input data shape:
    # here, 11-dimensional vectors.
    model.add(Dense(64, activation='relu', input_dim=xFrame.shape[1]))
    model.add(Dropout(0.5))
    model.add(Dense(64, activation='relu'))
    model.add(Dropout(0.5))
    model.add(Dense(5, activation='softmax'))

sgd = SGD(lr=0.01, decay=1e-6, momentum=0.9, nesterov=True)
    model.compile(loss='categorical_crossentropy',
                  optimizer=sgd,
                  metrics=['accuracy'])

return model model = baseline_model()
model.summary()
```

| Layer (type) | Output Shape | Param # |
|---|---|---|
| dense_4 (Dense) | (None, 64) | 640 |
| dropout_3 (Dropout) | (None, 64) | 0 |
| dense_5 (Dense) | (None, 64) | 4160 |
| dropout_4 (Dropout) | (None, 64) | 0 |
| dense_6 (Dense) | (None, 5) | 325 |

Total params: 5,125
Trainable params: 5,125
Non-trainable params: 0

FIG. 4A

Train the model on the training set

```
[18] model.fit(X_train, Y_train,
              epochs=10,
              batch_size=1)
```

```
    WARNING:tensorflow:From /usr/local/lib/python3.6/dist-packages/tensorflow/python/ops/math_
    Instructions for updating:
    Use tf.cast instead.
    Epoch 1/10
    36708/36708 [==============================] - 3s 90us/step - loss: 0.0093 - acc: 0.9665
    Epoch 2/10
    36708/36708 [==============================] - 3s 70us/step - loss: 0.0172 - acc: 0.9952
    Epoch 3/10
    36708/36708 [==============================] - 3s 71us/step - loss: 0.0117 - acc: 0.9964
    Epoch 4/10
    36708/36708 [==============================] - 3s 71us/step - loss: 0.0099 - acc: 0.9963
    Epoch 5/10
    36708/36708 [==============================] - 3s 70us/step - loss: 0.0099 - acc: 0.9965
    Epoch 6/10
    36708/36708 [==============================] - 3s 71us/step - loss: 0.0083 - acc: 0.9968
    Epoch 7/10
    36708/36708 [==============================] - 3s 71us/step - loss: 0.0080 - acc: 0.9970
    Epoch 8/10
    36708/36708 [==============================] - 3s 71us/step - loss: 0.0075 - acc: 0.9968
    Epoch 9/10
    36708/36708 [==============================] - 3s 71us/step - loss: 0.0079 - acc: 0.9968
    Epoch 10/10
    36708/36708 [==============================] - 3s 70us/step - loss: 0.0076 - acc: 0.9969
    <keras.callbacks.History at 0x7fc157d2a4e0>
```

Find the loss and accuracy of the model on the test set

```
[19] score = model.evaluate(X_test, Y_test, batch_size=1, verbose=1)
     print('Test loss:', score[0])
     print('Test accuracy:', score[1])
```

```
    9177/9177 [==============================] - 4s 479us/step
    Test loss: 0.08373597831400592663
    Test accuracy: 0.9984744469970328
```

FIG. 4B

```
Read bytes/s      16225792         0         0    16234496
Write bytes/s      5704704         0         0     5704704
Total bytes/s                                     21931008
```

```
Input data:
(1, 9)
rb1       16225792
rb2              0
rb3              0
rtotal    16234496
wb1        5704704
wb2              0
wb3              0
wtotal     5704704
total     21931008
Name: 0, dtype: int64

Normalized input:
rb1       1.906962
rb2      -0.498987
rb3      -1.099165
rtotal   -0.952711
wb1       1.587385
wb2      -0.498955
wb3      -1.117488
wtotal   -0.758144
total    -1.036122
Name: 0, dtype: float64

Prediction output:
[[1.00000000e+00 4.6854925e-20 4.6016619e-21 3.7055804e-25 6.0241720e-19]]
```

Predicted workload type: Exchange

FIG. 4C

METHODS AND APPARATUS FOR APPLICATION PREDICTION THROUGH MACHINE LEARNING BASED ANALYSIS OF IO PATTERNS

FIELD

The field relates generally to information processing systems, and more particularly to storage in information processing systems.

BACKGROUND

Storage arrays and other types of storage systems are often shared by multiple host devices over a network. However, it can be difficult in these and other situations to satisfy the particular input-output (IO) processing performance requirements of the potentially large numbers of distinct applications that may execute at different times on one or more host devices. As a result, the overall IO processing performance across the multiple distinct applications can be substantially less than optimal under certain conditions. Accordingly, a need exists for improved techniques for processing IO operations from multiple distinct applications sharing a storage system over a network.

SUMMARY

Illustrative embodiments provide techniques for application prediction through analysis of TO patterns using machine learning. Such techniques can be implemented in a host device and/or a storage system.

For example, in some host device embodiments, a multi-path layer of one or more host devices is configured to include functionality for application prediction through machine learning based analysis of IO patterns in conjunction with communication with a storage array or other type of storage system via a storage area network (SAN) or other type of network. The multi-path layer illustratively comprises at least one multi-path input-output (MPIO) driver configured to process TO operations of at least one host device. Some storage system embodiments can be similarly configured to include functionality for application prediction through machine learning based analysis of IO patterns.

These and other arrangements can allow a host device and/or a storage system to better adapt limited IO processing resources as a function of application predictions generated by a machine learning system, thereby providing better overall IO processing performance across multiple distinct applications.

In one embodiment, an apparatus comprises a host device configured to communicate over a network with a storage system. The host device comprises an MPIO driver configured to control delivery of IO operations from the host device to the storage system over selected ones of a plurality of paths through the network.

The MPIO driver is further configured to collect information characterizing IO patterns for each of a plurality of different applications executing on the host device, and to provide the collected information to a machine learning system. The machine learning system utilizes the collected information to generate one or more application predictions based at least in part on analysis of observed IO patterns.

The collected information in some embodiments comprises statistical distributions of numbers of IO operations having payload sizes falling into specified ranges over a given time period. Such embodiments utilize these payload size statistics to learn characteristics of the typical IO patterns of particular applications over time so as to be able to recognize, identify or otherwise predict those applications from observed IO patterns. Additional or alternative statistics or other types of collected information can be used in other embodiments.

The machine learning system is illustratively implemented in the host device, in the storage system, or partially in the host device and partially in the storage system. For example, in some embodiments, the machine learning system is implemented within the MPIO driver, although numerous other arrangements are possible.

At least one of the host device and the storage system is illustratively configured to utilize the one or more application predictions generated by the machine learning system to adjust one or more parameters related to its processing of IO operations for the corresponding applications. For example, in some embodiments at least one of the host device and the storage system may be configured to allocate a relatively high level of processing resources to IO operations associated with a first application prediction, and to allocate a relatively low level of processing resources to IO operations associated with a second application prediction different than the first application prediction.

These and other illustrative embodiments include, without limitation, apparatus, systems, methods and computer program products comprising processor-readable storage media.

BRIEF DESCRIPTION OF THE DRAWINGS

FIGS. 4A, 4B and 4C, collectively referred to herein as FIG. 4, show different aspects of an example implementation of application prediction through machine learning based analysis of IO patterns in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
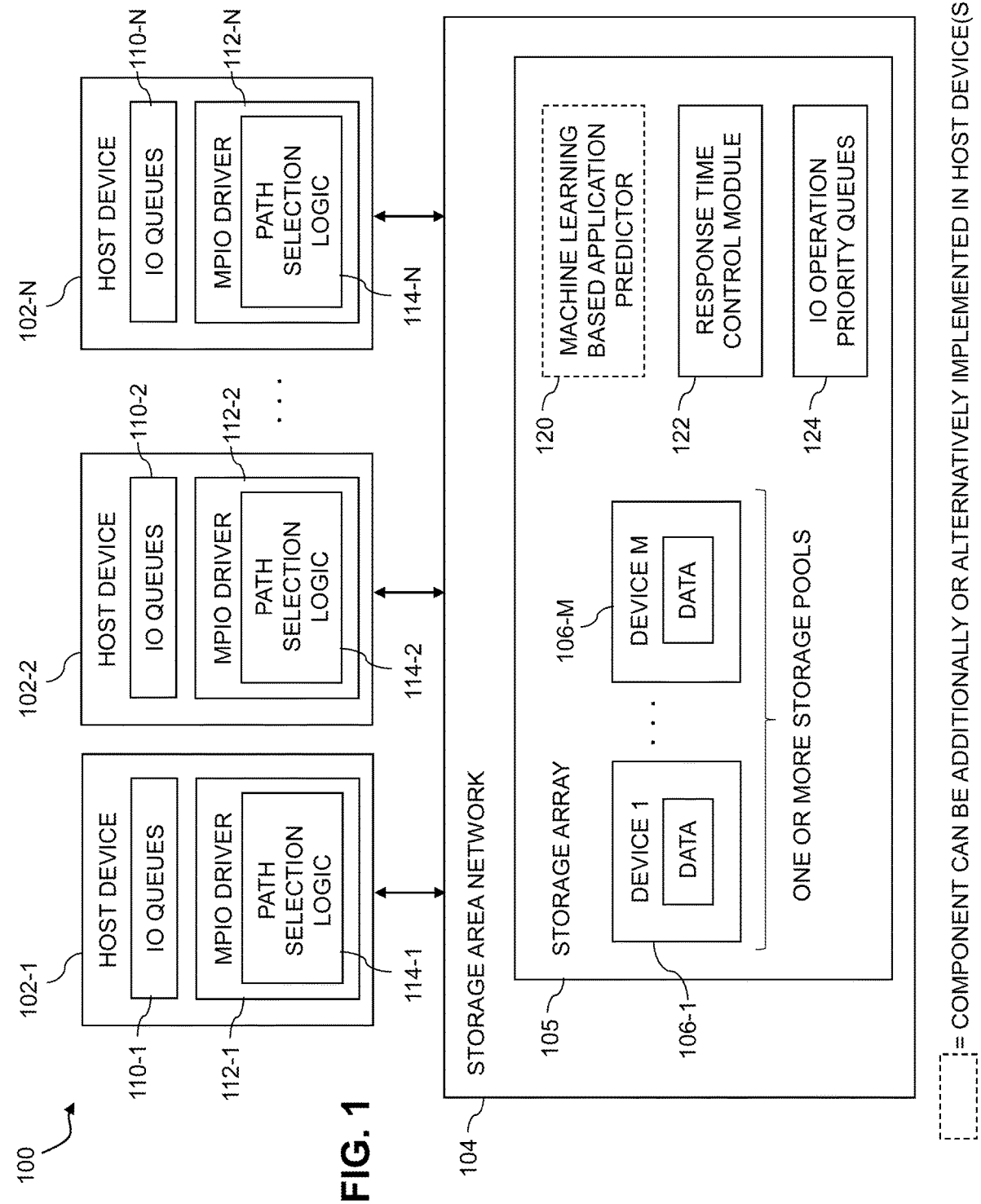
FIG. 1 is a block diagram of an information processing system configured with functionality for application prediction through machine learning based analysis of IO patterns in an illustrative embodiment.

FIG. 1 shows an information processing system 100 configured in accordance with an illustrative embodiment. The information processing system 100 comprises a plurality of host devices 102-1, 102-2, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N and respective MPIO drivers 112-1, 112-2, . . . 112-N. The MPIO drivers 112 collectively comprise a multi-path layer of the host devices 102. The multi-path layer provides functionality for application prediction through machine learning based analysis of IO patterns using respective instances of path selection logic 114-1, 114-2, . . . 114-N implemented within the MPIO drivers 112.

The MPIO drivers 112 may comprise, for example, otherwise conventional MPIO drivers, such as PowerPath® drivers from Dell EMC, suitably modified in the manner disclosed herein to implement functionality for application prediction. Other types of MPIO drivers from other driver vendors may be suitably modified to incorporate functionality for application prediction through machine learning based analysis of IO patterns as disclosed herein.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. Other types of sources of IO operations may be present in a given implementation of system 100.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

The MPIO driver 112-1 is further configured to collect information characterizing IO patterns for each of a plurality of different applications executing on the host device 102-1, and to provide the collected information to a machine learning system. The machine learning system utilizes the collected information to generate one or more application predictions based at least in part on analysis of observed IO patterns.

Additional examples of arrangements of this type are described below in conjunction with the embodiments of FIGS. 2, 3 and 4. For example, the operation of an example machine learning system in generating an application prediction based at least in part on analysis of observed IO patterns is illustrated in detail in FIG. 4.

At least one of the MPIO driver 112-1, the host device 102-1 and the storage array 105 is illustratively configured to initiate one or more automated actions responsive to a given application prediction generate by the machine learning system.

Such a machine learning system illustratively comprises, for example, a deep learning neural network or other type of neural network, or another type of artificial intelligence based system, configured to learn IO patterns of respective applications over time so as to able to recognize or otherwise predict, from a given observed IO pattern, the application that generated the IO pattern.

In some embodiments, the machine learning system more particularly comprises one or more machine learning based application predictors, such as machine learning based application predictor 120 implemented in the storage array 105. Additionally or alternatively, one or more machine learning based application predictors can be implemented in each of one or more of the host devices 102.

A machine learning system can therefore be implemented at least in part in the storage array 105 and/or one or more of the host devices 102. For example, the machine learning system can be implemented at least in part in the MPIO driver 112-1 of the host device 102-1. Numerous alternative arrangements of application predictors and other machine learning system components can be used in other embodiments.

A given "application prediction" as that term is broadly used herein is intended to encompass, for example, a recognition or other identification of a particular application or application type by a machine learning system from observation of an IO pattern having certain characteristics that through machine learning the system has associated with the particular application or application type.

It is therefore to be appreciated that an application prediction can recognize or otherwise identify a particular type of application from among a plurality of different application types utilizing an observed IO pattern.

Although operations such as collecting information characterizing IO patterns and providing the collected information to a machine learning system are controlled by or otherwise implemented at least in part by the MPIO driver 112-1 in the present embodiment, this is by way of example rather than limitation. In other embodiments, at least portions of these operations can be carried out elsewhere in the host device 102-1.

In some embodiments, collecting information characterizing IO patterns for each of a plurality of different applications executing on the host device 102-1 comprises collecting information for use in development of a machine learning model for deployment in the machine learning system. The collected information for use in development of the machine learning model illustratively comprises one or more of a training set for training the machine learning model to recognize particular types of applications from their respective IO patterns, and a testing set for evaluating performance of the machine learning model in recognizing particular types of applications from their respective IO patterns.

Such training and testing can be done in a separate platform of system 100, apart from the host devices 102 and the storage array 105. For example, the training and testing can be done on a separate cloud-based platform.

Once the model training and testing is complete, the model weights and other related information are stored in one or more files for subsequent deployment with one or more components of the system 100 to recognize, identify or otherwise predict applications from their respective unique IO patterns.

Accordingly, collecting information characterizing IO patterns for each of a plurality of different applications executing on the host device 102-1 illustratively comprises collecting information for use by a deployed machine learning model of the machine learning system in generating the one or more application predictions.

In some embodiments, collecting information characterizing IO patterns for each of a plurality of different applications executing on the host device 102-1 illustratively comprises determining statistical distributions of numbers of IO operations having payload sizes falling within specified ranges over a given time period. For example, a set of such payload size ranges is illustratively given by {<=4K, 4K to 64K, 64K to 128K, >128K}, although other payload size ranges can be used.

These and other embodiments recognize that particular application types can have unique distributions of IO operations of different payload sizes, transaction sequences and other measurable characteristics over time. These distributions can serve as "fingerprints" of respective distinct application types that are recognizable by a trained machine learning model. Such statistics and other information are collected from different application types, such as Oracle, Exchange, Sybase, data warehousing and other applications running on one or more hosts. The relevant data in some embodiments is extracted using one or more scripts and saved as individual comma-separated value (CSV) files.

A wide variety of other types of statistics characterizing IO patterns can be collected by the MPIO driver 112-1 and provided to the machine learning system.

In some embodiments, statistics and other information characterizing IO patterns are collected by the MPIO driver 112-1 using the PowerPath® Path Management Insight (PMI) feature. For example, PowerPath® PMI can serve as a collection point for statistics or other information characterizing IO patterns, possibly based on counts of read requests, write requests or other types of IO operations having payload sizes that fall within particular specified ranges of payload sizes within a given period of time.

Additionally or alternatively, weights and other information associated with a trained and tested machine learning model can be deployed directly into the MPIO driver 112-1, with PowerPath® PMI or another similar feature of the MPIO driver 112-1 being reconfigured to feed IO statistics directly to the deployed model. The resulting application predictions are illustratively displayed to a user as part of a PMI display output, in addition to or in place of being used to trigger one or more automated actions.

In some embodiments, the MPIO driver 112-1 is further configured to receive the one or more application predictions generated by the machine learning system, and to utilize the one or more application predictions received from the machine learning system to modify a path selection algorithm implemented by path selection logic 114-1 of the MPIO driver for selecting paths for delivery of IO operations from the host device 102-1 to the storage array 105 through the SAN 104. Accordingly, the path selection logic 114-1 can alter its path selection algorithm so as to better accommodate the particular IO processing requirements of particular detected application types.

Similarly, the application predictions can be sent to the storage array 105 for use in adjusting allocation of its IO processing resources in accordance with particular detected application types.

As indicated above, a given application prediction generated by the machine learning system illustratively comprises information identifying a particular one of a plurality of possible application types. At least one of the host device 102-1 and the storage array 105 is configured to utilize the one or more application predictions generated by the machine learning system to adjust one or more parameters related to its processing of IO operations for the corresponding applications. For example, at least one of the host device 102-1 and the storage array 105 is illustratively configured to allocate a relatively high level of processing resources to IO operations associated with a first application prediction, and to allocate a relatively low level of processing resources to IO operations associated with a second application prediction different than the first application prediction. Numerous other resource allocation arrangements may be adjusted, modified or otherwise controlled using the application predictions generated by the machine learning system.

As indicated above, the machine learning system in some embodiments runs at least in part on the storage array 105 and/or the host device 102-1, but can additionally or alternatively run on one or more other ones of the host devices 102. For example, it is possible in some embodiments that a particular one of the host devices 102 can be dedicated to implementing a machine learning system for use by other ones of the host devices 102.

Responsive to one or more of application predictions generated in the manner described herein, various automated actions can be taken. For example, an assignment of one or more initiators to one or more targets can be adjusted, possibly by shifting at least one of the initiators from a current target corresponding to a first port of the storage array 105 having a relatively high TO processing load to an updated target corresponding to a second port of the storage array 105 having a relatively low IO processing load. Additionally or alternatively, various adjustments can be made in at least one mapping of initiators, targets and logical devices that indicates for each of the initiators at least one target that is to be used to communicate with a given logical device of the storage array 105.

The MPIO driver 112-1 is further configured in some embodiments to initiate an automated reconfiguration process to redefine zoning and masking information that characterizes relationships between the initiators and the targets responsive to one or more application predictions, and/or to initiate an automated path discovery process to discover new paths through the SAN 104 responsive to one or more application predictions. A wide variety of other automated actions can be taken based at least in part on application predictions generated by a machine learning system in illustrative embodiments.

These and other operations referred to herein as being performed by or under the control of the MPIO driver 112-1 can in some embodiments be performed at least in part outside of the MPIO driver 112-1, such as in the host device 102-1 generally.

In some embodiments, a predetermined command is sent from the host device 102-1 to the storage array 105, illustratively utilizing the MPIO driver 112-1, to determine if zoning and masking information has been changed. The predetermined command can comprise, for example, a log sense command, a mode sense command, a "vendor unique command" or VU command, or combinations of multiple instances of these or other commands, in an otherwise standardized command format.

As noted above, the MPIO driver 112-1 illustratively initiates one or more automated actions responsive to an application prediction. Such automated actions can also be performed at least in part by the MPIO driver 112-1, rather than just initiated by the MPIO driver 112-1, but can additionally or alternatively be performed at least in part by other components of the host device 102-1 or the system 100.

For example, as indicated above, a given automated action initiated by the MPIO driver 112-1 responsive to an application prediction illustratively comprises automatically adjusting an assignment of one or more of the initiators to one or more of the targets based at least in part on the application prediction.

As another example, a given automated action initiated by the MPIO driver 112-1 responsive to an application prediction illustratively comprises initiating automated deployment of one or more additional paths associated with respective spare communication links between the host device 102-1 and the storage array 105.

As a further example, a given automated action initiated by the MPIO driver 112-1 responsive to the application prediction comprises initiating generation of a notification of the application prediction for delivery to a host administrator.

Additionally or alternatively, an automated action initiated by the MPIO driver 112-1 responsive to the application prediction can comprise initiating generation of a notification for delivery to the storage array 105. Such a notification for delivery to the storage array 105 illustratively comprises a "vendor unique command" or VU command in an otherwise standardized command format, such as a SCSI command format, although other command formats may be used.

Yet another example of an automated action that may be initiated by the MPIO driver 112-1 comprises initiating an adjustment to an algorithm utilized in path selection for delivery of IO operations from the set of IO queues 110-1 to the storage array 105. Such an algorithm illustratively comprises a scheduling algorithm, load balancing algorithm or other type of algorithm utilized in selecting IO operations for delivery over particular selected ones of multiple available paths. A given such algorithm can incorporate both scheduling and load balancing functionality.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

As indicated previously, absent use of the techniques for application prediction through machine learning based analysis of IO patterns as disclosed herein, it can be difficult to satisfy the particular IO processing performance requirements of the potentially large numbers of distinct applications that may execute at different times on the host devices 102, possibly leading to deficient performance across the multiple distinct applications.

These and other drawbacks are advantageously overcome in illustrative embodiments herein by utilization of a multi-path layer comprising one or more of the MPIO drivers 112 to facilitate application prediction through machine learning based analysis of IO patterns as described above.

For example, illustrative embodiments disclosed herein advantageously allow one or more of the host devices 102 and/or the storage array 105 of system 100 to better adapt limited 10 processing resources as a function of application predictions generated by a machine learning system, thereby providing better overall IO processing performance across multiple distinct applications.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

As indicated previously, the host device 102-1 may be configured to generate a notification for delivery to a host administrator responsive to an application prediction. Additionally or alternatively, the host device 102-1 may be configured to generate a notification for delivery to the storage array 105 responsive to an application prediction. Other types of reporting arrangements are utilized in other embodiments.

The above-described functions of the MPIO driver 112-1 are carried out at least in part under the control of its path selection logic 114-1. For example, the path selection logic 114-1 is illustratively configured to control performance of the steps of the process to be described below in conjunction with FIG. 2. In other embodiments, one or more such steps can be more generally performed by the host device 102-1. Other system components such as storage array 105 can also participate in the FIG. 2 process.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105 and the MPIO drivers 112 of such other host devices are each similarly configured to deliver IO operations from its corresponding one of the sets of IO queues 110 to the storage array 105 over selected paths through the SAN 104, and to perform at least portions of the disclosed functionality for application prediction through machine learning based analysis of IO patterns.

Accordingly, functionality described above in the context of the first MPIO driver 112-1 and the first host device 102-1 is assumed to be similarly performed by each of the other MPIO drivers 112-2 through 112-N and/or more generally by their respective host devices 102-2 through 102-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support application prediction through machine learning based analysis of IO patterns.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

As indicated previously, the storage array 105 in the present embodiment comprises at least one machine learning based application predictor 120. The machine learning based application predictor 120 illustratively comprises at least a portion of what is more generally referred to herein as a "machine learning system." The machine learning based application predictor 120 is shown in dashed outline, as it represents a component that can be additionally or alternatively implemented in one or more of the host devices 102.

Accordingly, in some embodiments, a machine learning system can comprise a plurality of machine learning based application predictors implemented in the storage array 105 and/or at least a subset of the host devices 102. The machine learning system in other embodiments can be entirely separate from the host devices 102 and the storage array 105. For example, the machine learning system can be implemented in another processing platform of system 100 accessible to the host devices 102 and/or the storage array 105 over the SAN 104 or another network not explicitly shown in the figure.

The storage array 105 in the present embodiment further comprises additional components such as response time control module 122 and IO operation priority queues 124, illustratively configured to make use of the above-described persistent memory. For example, the response time control module 122 may be used to implement storage array based adjustments in response time for particular IO operations based at least in part on service level objective (SLO) information stored by the storage array 105 in its persistent memory. The response time control module 122 operates in conjunction with the IO operation priority queues 124.

The storage array 105 utilizes its IO operation priority queues 124 to provide different levels of performance for IO operations. For example, the IO operation priority queues 124 may have respective different priority levels. The storage array 105 may be configured to provide different priority levels for different ones of the IO operations by assigning different ones of the TO operations to different ones of the IO operation priority queues 124. The IO operation priority queues 124 are illustratively associated with respective SLOs for processing of IO operations in the storage array 105.

Process tags may be used in assigning different ones of the IO operations to different ones of the IO operation priority queues 124, as disclosed in U.S. patent application Ser. No. 15/849,828, filed Dec. 21, 2017 and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112, path selection logic 114 and machine learning based application predictor 120 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, the application prediction techniques disclosed herein can be utilized to recognize, identify or otherwise predict applications that are running in a storage system rather than on one or more host devices. In such an embodiment, the storage system can automatically adjust its IO processing resource allocations based at least in part on the application predictions generated by a machine learning system, possibly implemented within the storage system itself. For example, the storage system can set different priorities for different application types.

The operation of the information processing system 100 will now be described in further detail with reference to the flow diagram of the illustrative embodiment of FIG. 2. The process as shown includes steps 200 through 206, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
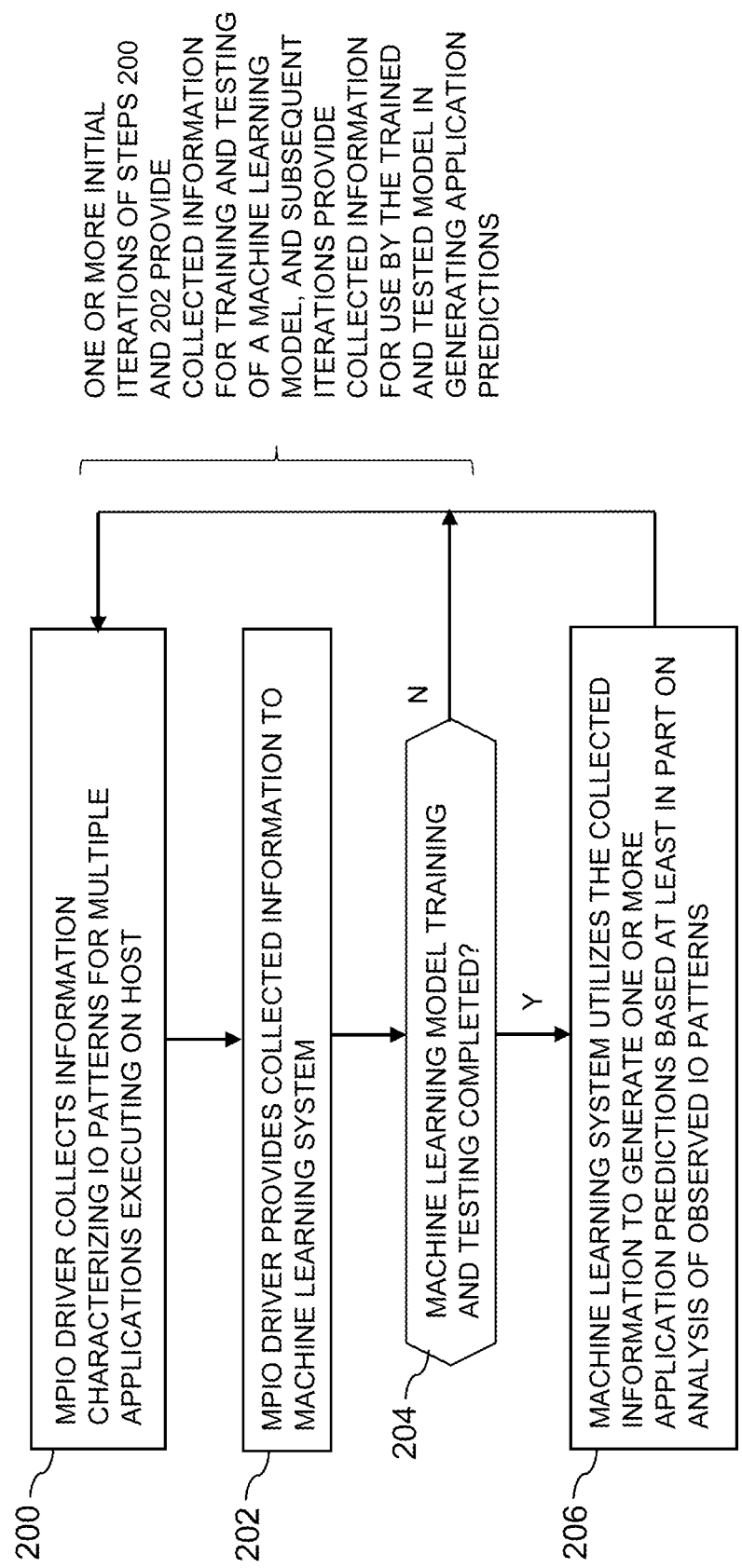
FIG. 2 is a flow diagram of a process for application prediction through machine learning based analysis of IO patterns in an illustrative embodiment.

The steps of the FIG. 2 process are illustratively performed at least in part by or under the control of an MPIO driver of a given host device. For example, portions of the process may be carried out under the control of software, firmware and/or hardware of an instance of path selection logic deployed within the MPIO driver. Other arrangements of host device components and/or other system components can be configured to perform at least portions of one or more of the steps in other embodiments.

In step 200, an MPIO driver collects information characterizing IO patterns for respective ones of multiple applications executing on a host device.

The IO pattern for a given one of the applications illustratively comprises a pattern of IO operations generated by the application and delivered from the host device to the storage system over selected paths under the control of an MPIO driver. For example, one or more IO operations selected from one or more queues of a given set of queues of the host device are illustratively directed to a particular logical storage device of the storage array over a selected one of a plurality of available paths, with each such path being associated with a different initiator-target pair, where the initiators comprise respective HBAs of the host device and the targets comprise respective ports of the storage array.

At least some of the paths from the host device to the storage array may be determined using an initial path discovery scan performed in conjunction with booting of the host device. It is assumed for the description of this embodiment that the host device has discovered a plurality of paths to the storage array, and further that at least one logical storage device of the storage array is visible to the host device on each of the paths.

The path discovery scan can be repeated responsive to one or more detected path changes or under other specified conditions. For example, a storage administrator or other user may perform zoning and/or masking changes to the storage array that result in at least one new path becoming available to the host device. Accordingly, the set of multiple paths over which IO operations are delivered from the host device to particular logical devices of the storage array can change over time.

In step 202, the MPIO driver provides the collected information to a machine learning system. The machine learning system illustratively comprises at least one machine learning based application predictor, and can be implemented at least in part in the MPIO driver, its corresponding host device and/or the storage array. For example, a distributed machine learning system can be used in some embodiments, with multiple machine learning based application predictors implemented on respective ones of multiple host devices and/or the storage array. Alternatively, the machine learning system in other embodiments can be implemented on a separate processing platform comprising at least one processing device configured to communicate with the host device and/or the storage array over a network. The term "machine learning system" as used herein is therefore intended to be broadly construed, so as to encompass these and other possible implementations.

In step 204, a determination is made as to whether or not the training and testing of a machine learning model utilized by the machine learning system to recognize the IO patterns of different applications has been completed. If the training and testing of the machine learning model is not yet complete, the process returns to step 200 as indicated in order to collect additional information characterizing IO patterns for use in the training and testing of the machine learning model. Otherwise, the training and testing of the machine learning model is complete, and the process moves to step 206.

In step 206, the machine learning system utilizes the collected information to generate one or more application predictions based at least in part on analysis of observed IO patterns.

As indicated in the figure, one or more initial iterations of steps 200 and 202 provide collected information for training and testing of the machine learning model, and subsequent iterations provide collected information for use by the trained and tested machine learning model in generating application predictions.

Additional or alternative steps can be used in other embodiments. For example, the MPIO driver or other components of the host device and/or storage array can perform one or more other automated actions responsive to application predictions. Examples of additional or alternative automated actions that may be performed responsive to application predictions are described elsewhere herein.

Multiple additional instances of the FIG. 2 process may be performed in respective additional host devices that share the storage array. As indicated above, the machine learning system referred to in step 206 may be implemented in one or more of the host devices, the storage array and/or an external processing platform.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for application prediction through machine learning based analysis of IO patterns. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different application prediction arrangements within different host devices and/or storage arrays of a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
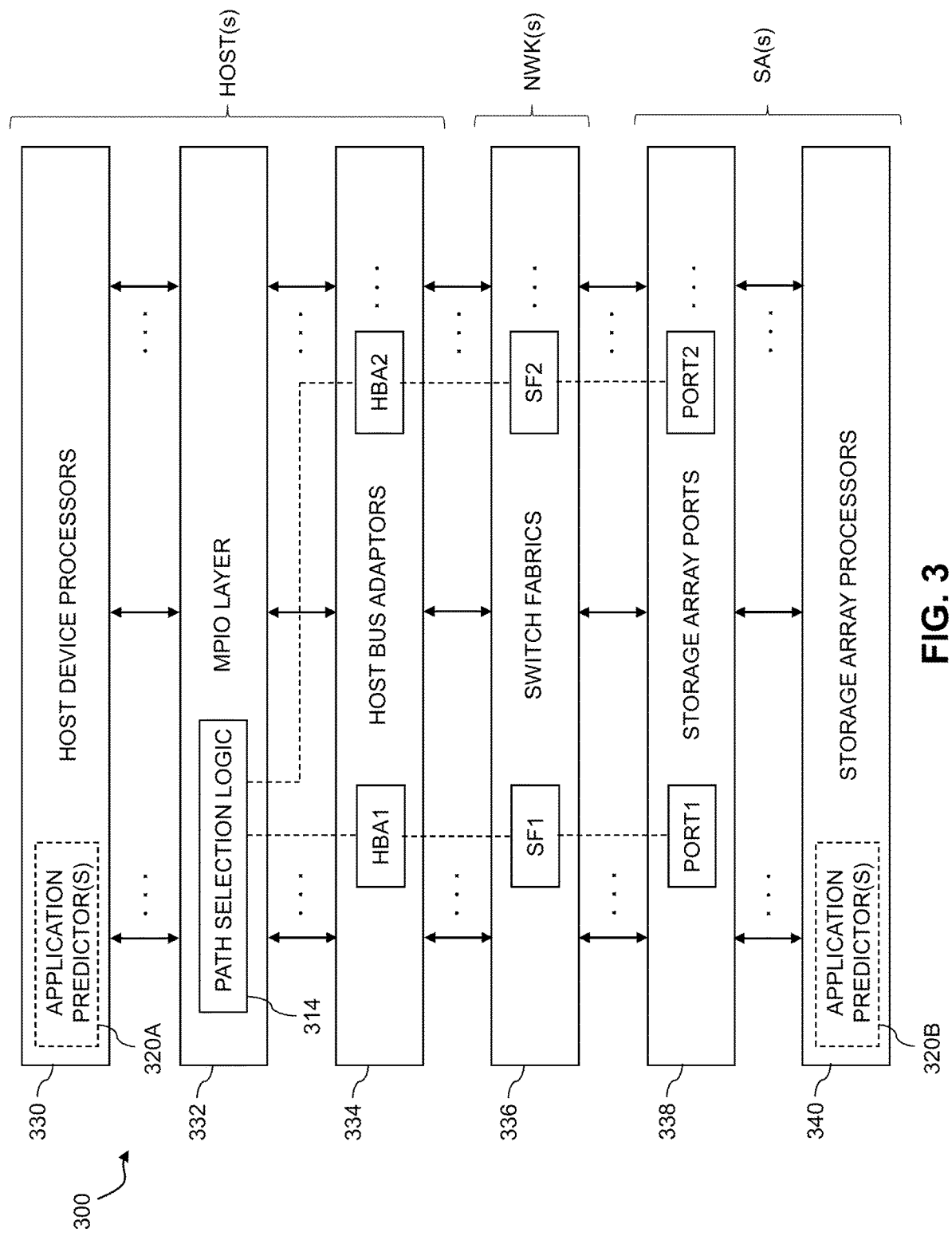
FIG. 3 is a block diagram showing multiple layers of a layered system architecture that includes functionality for application prediction through machine learning based analysis of IO patterns in an illustrative embodiment.

Referring now to FIG. 3, another illustrative embodiment is shown. In this embodiment, an information processing system 300 comprising at least one instance of path selection logic 314 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The MPIO layer 332 is an example of what is also referred to herein as a multi-path layer, and comprises one or more MPIO drivers implemented in respective host devices. Each such MPIO driver illustratively comprises an instance of path selection logic 314 configured substantially as previously described. Additional or alternative layers and path selection logic arrangements can be used in other embodiments.

In the system 300, path selection logic 314 is configured to select different paths for sending JO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338.

The system 300 in this embodiment further implements a machine learning system comprising one or more application predictors 320A and/or one or more application predictors 320B. The one or more application predictors 320A are implemented in one or more host device processors of the host device processor layer 330. The one or more application predictors 320B are implemented in one or more storage array processors of the storage array processor layer 340. Each of the application predictors 320 comprises a machine learning based application predictor that is part of a machine learning system configured to generate application predictions based at least in part on analysis of observed JO patterns as disclosed herein. A machine learning system in some embodiments comprises a processor-based system that includes at least one machine learning based application predictor, and that utilizes a neural network or other type of machine learning model to recognize particular applications executing on the host devices by analysis of observed IO patterns.

It is assumed in this embodiment that the MPIO layer 332 provides functionality associated with application prediction, under the control of the path selection logic 314, possibly with involvement of other host device components. For example, one or more MPIO drivers of the MPIO layer 332 are each illustratively configured to collect information characterizing IO patterns for each of a plurality of different applications executing on the host device processor layer 330, and to provide the collected information to a machine learning system comprising one or more application predictors 320A and/or one or more application predictors 320B. The path selection logic 314 is illustratively configured to collect such information and to provide it to at least one of the application predictors 320A and 320B.

Although the one or more application predictors 320A are shown in FIG. 3 as being implemented within the host device processor layer 330, this is by way of illustrative example only. In other embodiments, the one or more application predictors 320A can be implemented at least in part in the MPIO layer 332. For example, a given MPIO driver of the MPIO layer 332 can implement an application predictor in some embodiments. Numerous other arrangements of the application predictors 320A and 320B can be used. Like the machine learning based application predictor 120 of FIG. 1, the application predictors 320A and 320B are shown in dashed outline, to indicate that their placement within the system 300 can vary depending upon the particular implementation of the machine learning system in a given embodiment.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths. For example, the storage array in some embodiments can be configured to increment a counter if zoning and masking has changed, and the MPIO driver of the host device can utilize a log sense command, a mode sense command or a "vendor unique" or VU command to determine the current counter value and trigger path discovery based on a change in that value.

Another illustrative embodiment of application prediction through machine learning based analysis of IO patterns will now be described with reference to FIG. 4. This figure includes three different portions, denoted FIG. 4A, FIG. 4B and FIG. 4C, each showing a different aspect of an example implementation of application prediction through machine learning based analysis of IO patterns.

FIG. 4A illustrates an example machine learning model in the present embodiment. The machine learning model comprises a deep learning neural network model comprising an input layer, multiple hidden layers and an output layer. The hidden layers more particularly include two dense layers of 64 hidden units each, and two dropout layers also of 64 hidden units each, as listed in the table at the lower portion of the figure. The model is a sequential model, with a total of six layers including an input layer with 9 units, the four hidden layers mentioned previously, and an output layer with five units. There are a total of 5,125 trainable parameters in this particular machine learning model. The model is illustratively implemented using Google Colaboratory, Keras and TensorFlow.

Referring now to FIG. 4B, the upper portion of the figure illustrates training of the model on a training set over 10 epochs, and the lower portion of the figure determines the loss and accuracy of the trained model on a testing set ("test set"). The training set in this example comprises 36,708 samples, and the test set comprises 9,177 samples. The accuracy of the trained model on the test set was found to be 99.84%.

FIG. 4C illustrates generation of an application prediction based on new data characterizing an IO pattern. The prediction output in this example indicates that the predicted workload type determined by the trained model based on the IO pattern of the new data is an Exchange application, as opposed to some other type of application, such as an Oracle application, a Sybase application, and/or a data warehousing application, that the model has been trained to recognize, identify or otherwise predict from a corresponding IO pattern.

The particular application prediction arrangements described above in conjunction with FIGS. 2, 3 and 4 are presented by way of illustrative example only. Numerous alternative arrangements of these and other features can be used in implementing other illustrative embodiments. For example, a wide variety of different machine learning models can be used in other embodiments.

The illustrative embodiments disclosed herein can provide a number of significant advantages relative to conventional arrangements.

For example, some embodiments configure a multi-path layer of one or more host devices to include functionality for application prediction through machine learning based analysis of IO patterns.

In some embodiments, deep learning neural networks or other types of neural networks, or more generally machine learning models, are utilized to provide highly accurate application predictions.

Techniques for application prediction through machine learning based analysis of IO patterns as disclosed herein can be implemented at least in part in a host device and/or a storage system. For example, the host device and/or storage system can be configured to implement a machine learning system comprising one or more machine learning based application predictors. In other embodiments, the machine learning system may be external to the host device and storage system.

Illustrative embodiments allow a host device and/or a storage system to better adapt limited IO processing resources as a function of application predictions generated by a machine learning system, thereby providing better overall IO processing performance across multiple distinct applications.

These and other embodiments avoid the need for explicit host-based tagging of individual IO operations, and are broadly applicable to a wide variety of different use cases and application types.

For example, some embodiments are particularly useful in cloud infrastructure deployments in which it would otherwise be very difficult to determine which applications are running on which hosts and using which logical storage volumes. Application predictions generated in these and other embodiments can facilitate the optimization or other improvement of application performance by permitting allocation of IO processing resources based on particular application needs.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

The cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, application predictors, machine learning systems, machine learning models and additional or alternative components. Also, the particular configurations of system and device elements and associated processing operations illustratively shown in the drawings can be varied in other embodiments. For example, a wide variety of different MPIO driver configurations and associated application prediction arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
  a host device configured to communicate over a network with a storage system comprising a plurality of storage devices;
  the host device comprising a multi-path input-output driver configured to control delivery of input-output operations from the host device to the storage system over selected ones of a plurality of paths through the network;
  wherein the multi-path input-output driver is further configured:
  to collect information characterizing input-output patterns for each of a plurality of different applications executing on the host device; and
  to provide the collected information to a machine learning system;
  wherein the machine learning system utilizes the collected information to generate one or more application predictions based at least in part on analysis of observed input-output patterns;
  wherein the machine learning system generates a first application prediction indicating a first application type responsive to detection of a first input-output pattern, and generates a second application prediction indicating a second application type different than the first application type responsive to detection of a second input-output pattern different than the first input-output pattern;
  wherein collecting information characterizing input-output patterns for each of a plurality of different applications executing on the host device comprises determining, based at least in part on one or more counts of read requests, write requests or other types of input-output operations, statistical distributions of numbers of input-output operations having payload sizes falling within specified ranges over a given time period; and
  wherein the one or more application predictions generated by the machine learning system are utilized to modify a path selection algorithm implemented by the multi-path input-output driver for selecting paths for delivery of input-output operations from the host device to the storage system through the network.

2. The apparatus of claim 1 wherein the machine learning system is implemented at least in part in the host device.

3. The apparatus of claim 2 wherein the machine learning system is implemented at least in part in the multi-path input-output driver of the host device.

4. The apparatus of claim 1 wherein the machine learning system is implemented at least in part in the storage system.

5. The apparatus of claim 1 wherein collecting information characterizing input-output patterns for each of a plurality of different applications executing on the host device comprises collecting information for use in development of a machine learning model for deployment in the machine learning system.

6. The apparatus of claim 5 wherein the collected information for use in development of the machine learning model comprises one or more of:
  a training set for training the machine learning model to recognize particular types of applications from their respective input-output patterns; and
  a testing set for evaluating performance of the machine learning model in recognizing particular types of applications from their respective input-output patterns.

7. The apparatus of claim 1 wherein collecting information characterizing input-output patterns for each of a plurality of different applications executing on the host device comprises collecting information for use by a deployed machine learning model of the machine learning system in generating the one or more application predictions.

8. The apparatus of claim 1 wherein the multi-path input-output driver is further configured:
  to receive the one or more application predictions generated by the machine learning system.

9. The apparatus of claim 1 wherein a given application prediction generated by the machine learning system comprises information identifying a particular one of a plurality of possible application types.

10. The apparatus of claim 1 wherein at least one of the host device and the storage system is configured to utilize the one or more application predictions generated by the machine learning system to adjust one or more parameters related to its processing of input-output operations for the corresponding applications.

11. The apparatus of claim 10 wherein at least one of the host device and the storage system is further configured:
  to allocate a relatively high level of processing resources to input-output operations associated with a first application prediction; and
  to allocate a relatively low level of processing resources to input-output operations associated with a second application prediction different than the first application prediction.

12. The apparatus of claim 1 further comprising one or more additional host devices each configured to communicate over the network with the storage system and wherein each additional host device comprises a multi-path input-output driver configured to control delivery of input-output operations from that host device to the storage system over selected ones of a plurality of paths through the network.

13. The apparatus of claim 1 wherein the paths are associated with respective initiator-target pairs wherein each of the initiators comprises a corresponding one of a plurality of host bus adaptors of the host device and each of the targets comprises a corresponding one of a plurality of ports of the storage system.

14. A method comprising:
  controlling, in a multi-path input-output driver of a host device, delivery of input-output operations from the host device to a storage system over selected ones of a plurality of paths through a network;
  collecting, in the multi-path input-output driver, information characterizing input-output patterns for each of a plurality of different applications executing on the host device; and
  providing the collected information from the multi-path input-output driver to a machine learning system;

wherein the machine learning system utilizes the collected information to generate one or more application predictions based at least in part on analysis of observed input-output patterns;

wherein the machine learning system generates a first application prediction indicating a first application type responsive to detection of a first input-output pattern, and generates a second application prediction indicating a second application type different than the first application type responsive to detection of a second input-output pattern different than the first input-output pattern;

wherein collecting information characterizing input-output patterns for each of a plurality of different applications executing on the host device comprises determining, based at least in part on one or more counts of read requests, write requests or other types of input-output operations, statistical distributions of numbers of input-output operations having payload sizes falling within specified ranges over a given time period; and wherein the one or more application predictions generated by the machine learning system are utilized to modify a path selection algorithm implemented by the multi-path input-output driver for selecting paths for delivery of input-output operations from the host device to the storage system through the network.

15. The method of claim 14 wherein the multi-path input-output driver is further configured:
  to receive the one or more application predictions generated by the machine learning system.

16. The method of claim 14 wherein at least one of the host device and the storage system utilizes the one or more application predictions generated by the machine learning system to adjust one or more parameters related to its processing of input-output operations for the corresponding applications.

17. A computer program product comprising a non-transitory processor-readable storage medium having stored therein program code of one or more software programs, wherein the program code, when executed by a host device comprising a multi-path input-output driver, the host device being configured to communicate over a network with a storage system, causes the host device:
  to control, in the multi-path input-output driver of the host device, delivery of input-output operations from the host device to the storage system over selected ones of a plurality of paths through the network;
  to collect, in the multi-path input-output driver, information characterizing input-output patterns for each of a plurality of different applications executing on the host device; and
  to provide the collected information from the multi-path input-output driver to a machine learning system;

wherein the machine learning system utilizes the collected information to generate one or more application predictions based at least in part on analysis of observed input-output patterns;

wherein the machine learning system generates a first application prediction indicating a first application type responsive to detection of a first input-output pattern, and generates a second application prediction indicating a second application type different than the first application type responsive to detection of a second input-output pattern different than the first input-output pattern;

wherein collecting information characterizing input-output patterns for each of a plurality of different applications executing on the host device comprises determining, based at least in part on one or more counts of read requests, write requests or other types of input-output operations, statistical distributions of numbers of input-output operations having payload sizes falling within specified ranges over a given time period; and wherein the one or more application predictions generated by the machine learning system are utilized to modify a path selection algorithm implemented by the multi-path input-output driver for selecting paths for delivery of input-output operations from the host device to the storage system through the network.

18. The computer program product of claim 17 wherein the multi-path input-output driver is further configured:

to receive the one or more application predictions generated by the machine learning system.

19. The computer program product of claim 17 wherein at least one of the host device and the storage system utilizes the one or more application predictions generated by the machine learning system to adjust one or more parameters related to its processing of input-output operations for the corresponding applications.

20. The computer program product of claim 17 wherein a given application prediction generated by the machine learning system comprises information identifying a particular one of a plurality of possible application types.

* * * * *